Dec. 23, 1969　　　　　G. LEE　　　　　3,485,375
ROTARY TABLE FILTER CONSTRUCTION
Filed March 9, 1966　　　　　　　　　6 Sheets-Sheet 1

INVENTOR.
GRAHAM LEE
BY Theodore M. Jablon
ATTORNEY.

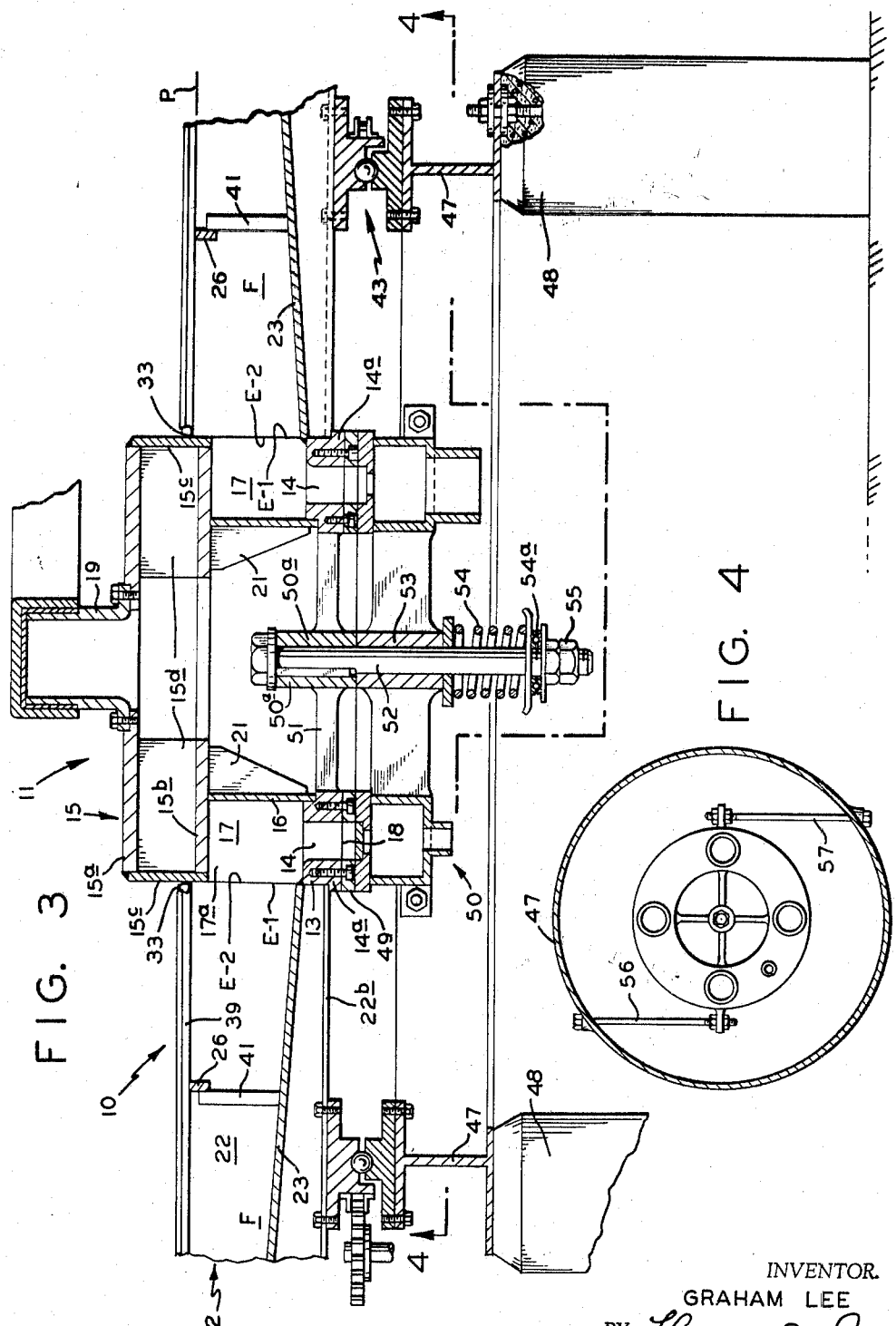

Dec. 23, 1969 G. LEE 3,485,375
ROTARY TABLE FILTER CONSTRUCTION
Filed March 9, 1966 6 Sheets-Sheet 3
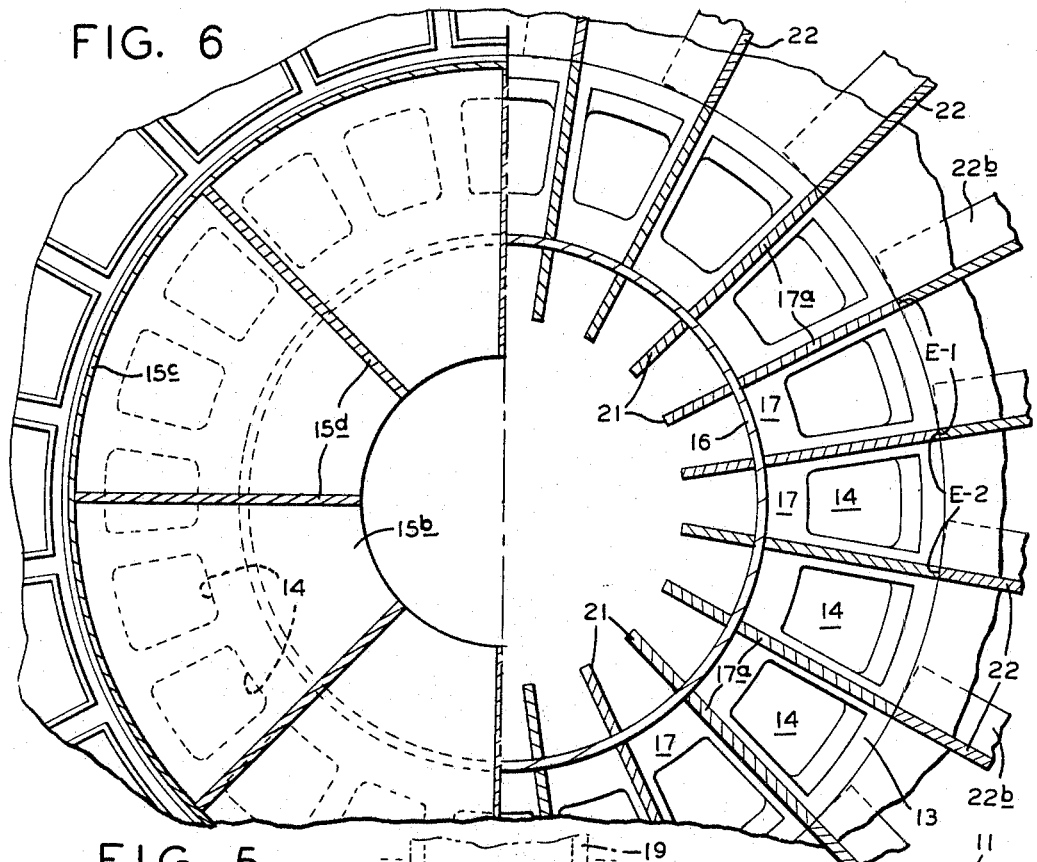
FIG. 6
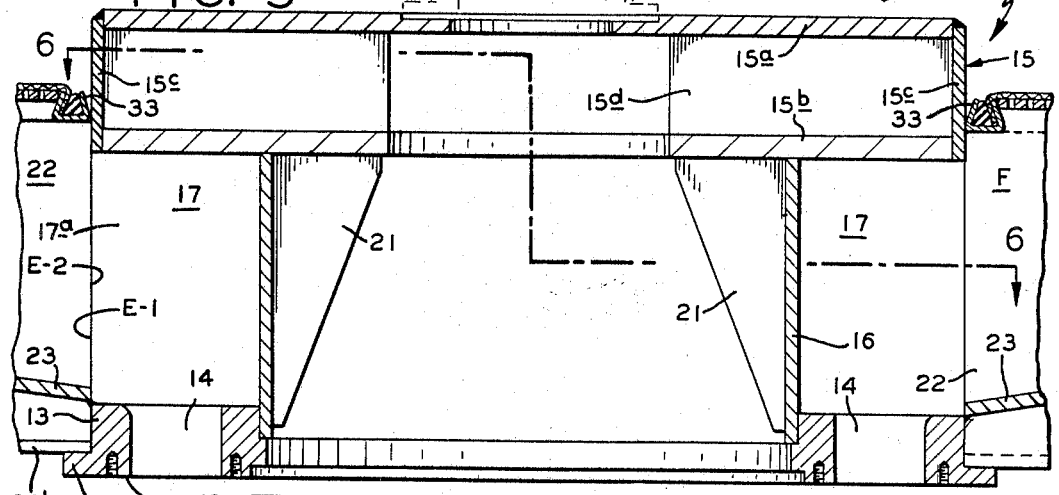
FIG. 5
FIG. 7
INVENTOR.
GRAHAM LEE
BY Theodore M. Jablon
ATTORNEY.

Dec. 23, 1969  G. LEE  3,485,375
ROTARY TABLE FILTER CONSTRUCTION
Filed March 9, 1966  6 Sheets-Sheet 4
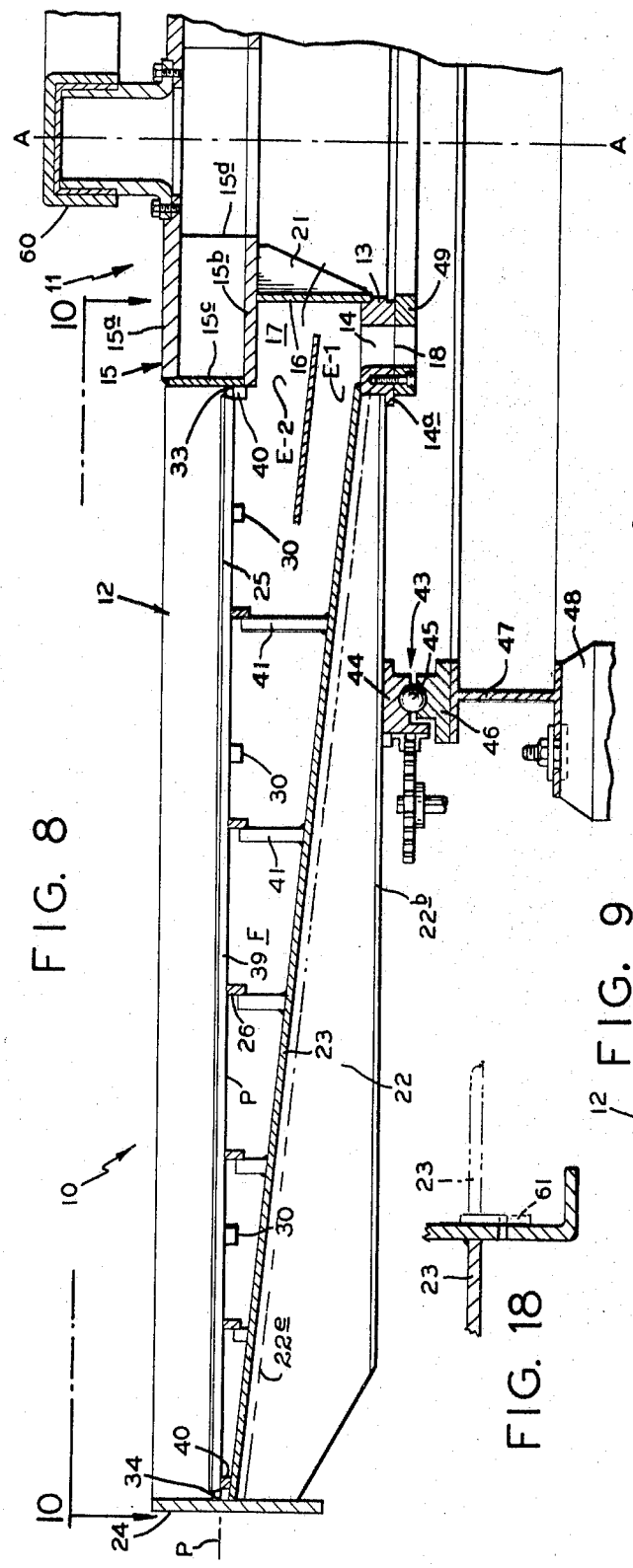
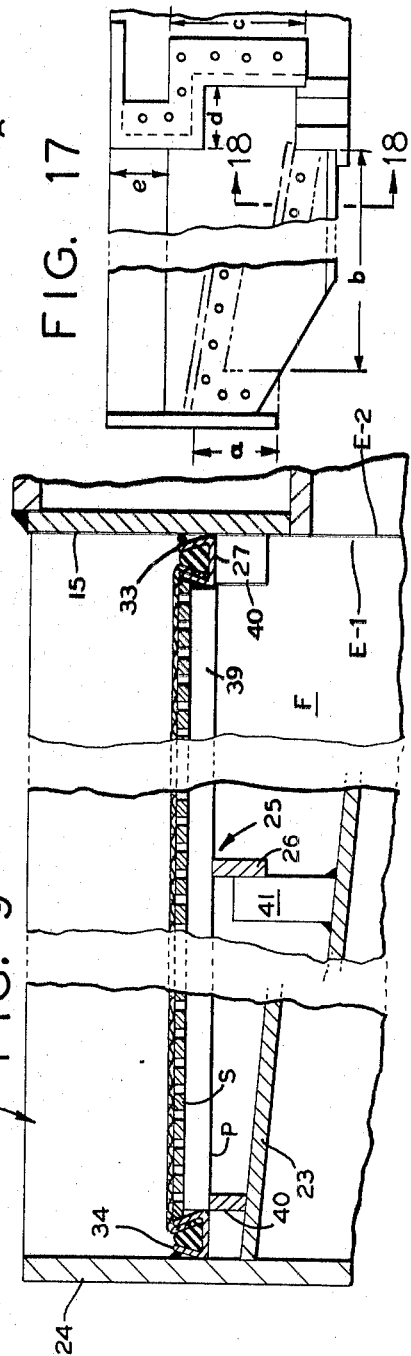
INVENTOR.
GRAHAM LEE
BY Theodore M. Jablon
ATTORNEY.

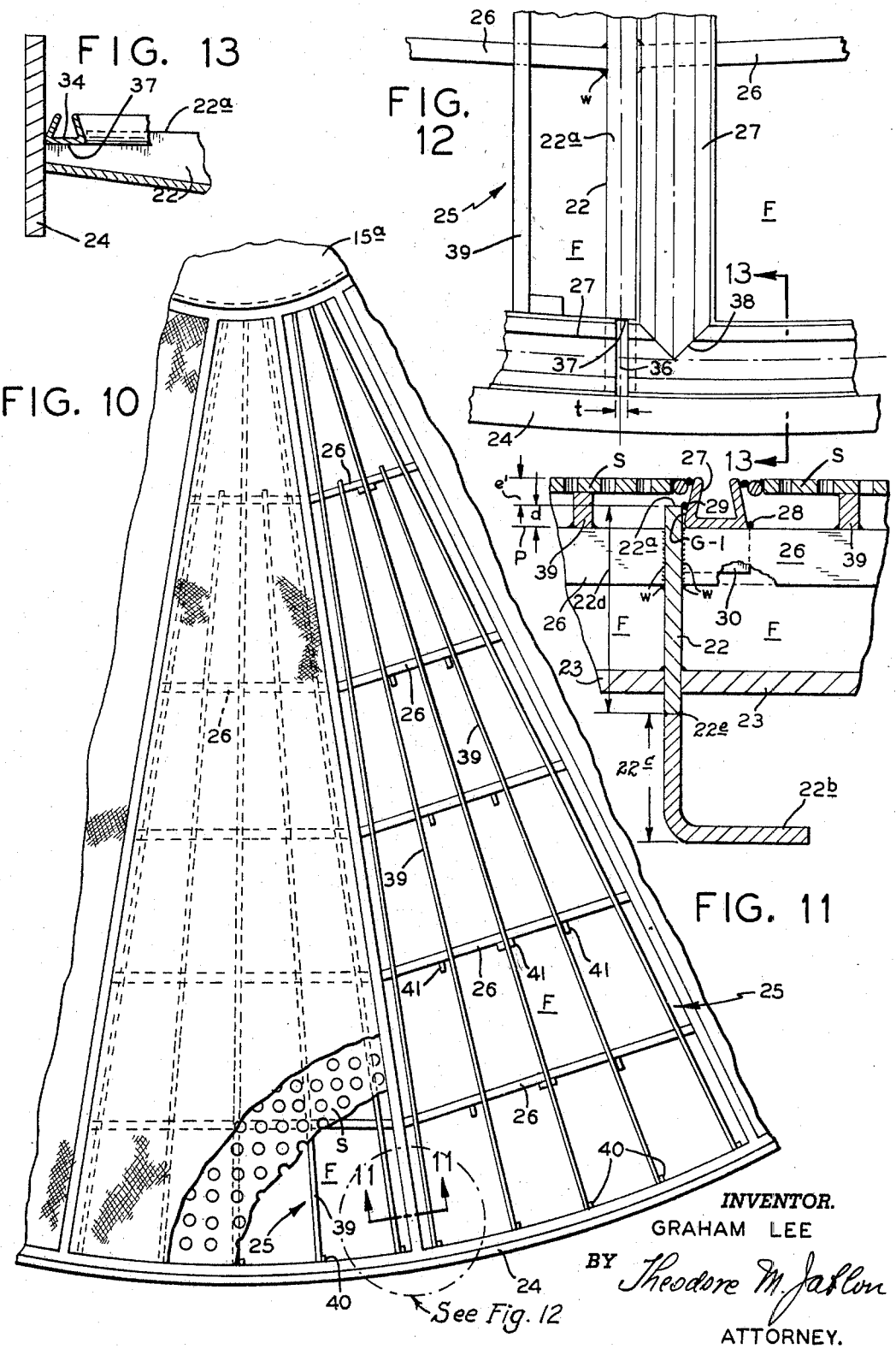

Dec. 23, 1969   G. LEE   3,485,375
ROTARY TABLE FILTER CONSTRUCTION
Filed March 9, 1966   6 Sheets-Sheet 6

INVENTOR.
GRAHAM LEE
BY *Theodore M. Jablon*
ATTORNEY.

United States Patent Office 3,485,375
Patented Dec. 23, 1969

3,485,375
ROTARY TABLE FILTER CONSTRUCTION
Graham Lee, Stamford, Conn., assignor to Dorr-Oliver Incorporated, Stamford, Conn., a corporation of Delaware
Filed Mar. 9, 1966, Ser. No. 532,929
Int. Cl. B01d 33/02, 33/00
U.S. Cl. 210—330                                12 Claims

ABSTRACT OF THE DISCLOSURE

A rotary filter pan construction built around a center island as in integral part of the construction, wherein each of the section-shaped filtrate chambers has a fixed horizontal grid structure constructed and arranged to present a horizontal reference plane parallel to the machined bottom face or valve face of the center island, which in turn insures parallelism between the bottom face and the filter media and their liquid-permeable backing plates or drainage plates.

---

This invention relates to continuous rotary table filters, and more particularly to improvements whereby the manufacture especially of machines of large filter pan diameter and large filtration capacity is facilitated and the construction cost reduced or minimized.

In the type of filter herein contemplated, the filter table or horizontal pan structure has radial vertical partitions subdividing it into sector-shaped individual filtration chambers adjoining one another around a central hub portion or center island portion which is part of the rotating table structure. The center island portion, herein briefly termed the "center island," has filtrate discharge openings at the bottom for the respective filtration chambers, arranged in a circle around the vertical axis of rotation. The underside of the center island presents a horizontal bottom face interrupted by the filtrate discharge openings, which bottom face should be parallel to the plane of the filter media mounted on the filtration chambers, as well as parallel to the operating plane of an annular support bearing for the filter table.

The underside of the center island is face to face with the top side of a stationary valve body constructed and arranged to cooperate with the filtrate discharge openings for automatically controlling the filtration cycle incident to the rotation of the filter table.

While increasing the size of table filters from, say, 15 ft. to about 25 ft. in diameter and even larger, may be economically and technically attractive because of the disproportionate gain in filter area and capacity, the relative cost factor will increase disproportionately due to certain limitations and problems arising in the manufactuing procedure involving the handling and machining of such large filter tables.

To appreciate the problem as well as the invention, it should be understood, more in particular, that in the conventional table filter the mounting of the sector-shaped filter media comprises the so-called divider strips or channel members extending radially along, and supported by the horizontal top faces of respective radial partitions. The inner ends and the outer ends of the divider strips are interconnected respectively by inner and outer arcuate channel members, the inner channel members hugging the center island, the outer channel members following the curvature of the peripheral boundary wall of the filter pan. A sector shaped channel frame thus defines the boundary of each effective sector-shaped filter area, with the filter media itself edgewise secured in this channel frame. Corresponding sector-shaped perforated backing plates or panels usually support the filter media, and are in turn supported by rigid grid structures and ledges provided in the respective filtration chambers.

Heretofore, after the plate work and construction of a large filter pan was completed by various welding operations with resultant unavoidable heat distortions of the pan and of the center island, a scarce supersize vertical lathe or boring mill had to be located for facing first one side and then the other side of a work piece of such a large diameter. Following this facing or finishing operation of one side, the large work piece then had to be turned over right-side-up and again centered and mounted on the mill using the first machined face as a horizontal reference plane. Then followed the facing or finishing of the top edges of the radial partitions as well as of the grid structures and associated horizontal ledges, thereby establishing the horizontal supporting plane for the filter media parallel to the machined bottom face or horizontal valve operating plane.

It is among the objects of this invention to provide table filters of the type set forth above even in the largest practical sizes, that can be constructed readily and inexpensively, without incurring the aforementioned problems due to prohibitive welding distortions and subsequent laborious and expensive handling and machining operations.

These objects are attainable by way of an improved filter table construction that lends itself to a novel manufacturing procedure.

The procedure requires that initially only the individual properly prepared center island be set up horizontally as a basic reference and starting element, followed by a sequence of asesmbling and welding operations leading to the completion of the filter table in its upright position. This procedure eventually establishes a critical reference plane or support plane at the top for the divider strips and the filter media, without requiring the aforementioned expensive handling and larger diameter facing operation and equipment.

Briefly, according to the invention, with the center island properly prepared and set up horizontally on the bottom face, the annular pan bottom construction is set up and built around and welded to the center island, with radial partitions dividing the pan into the sector-shaped filtration chambers. In a preferred embodiment, a grid structure is then built into each filtration chamber and welded in place, after having the top edges of the grid structure so leveled as to establish a horizontal support plane or reference plane for the divider strips, parallel to the bottom face of the center island. The support plane which may be identical with the reference plane, is spaced downwardly from the top edges of the radial partitions, so that the radial partitions will not protrude above the top edges of the laterally adjacent divider strips.

Preferably, the grid structure comprises a plurality of horizontally spaced transverse grid members which are levelled horizontally and then fixed relative to the bottom or walls of the filtration chamber. The top edges of the grid members in all the filtration chambers are level horizontally relative to one another, thus defining and providing the aforementioned level support or reference plane for locating the divider strips and eventually for the filter media secured therein.

For practical purposes, a set of radial grid members of equal height is fixed to the top edges of the transverse members, for supporting a perforated backing panel or the like having a top face substantially in a plane with the top edges of the divider strips, for supporting filter media secured in the divider strips.

The invention further features a construction wherein radial vertical partition members are welded, spider like, to the center island, and sector-shaped pan bottom sections are fitted inbetween respective radial partitions and edgewise welded thereto as well as to the center island.

An outer peripheral boundary wall is welded to the bottom sections as well as to the outer ends of the radial partitions. Each of the sector-shaped filtration chambers thus formed, connects with one of the filtrate discharge openings in the center island.

Specific features lie in the mounting of the annular support bearing for the filter table parallel to the horizontal reference plane, the shape and construction of the center island prepared for connection with the individual radial partitions, and details of the level support and mounting of the filter media parallel to the reference plane.

Other features and advantages will hereinafter appear.

As this invention may be embodied in several forms without departing from the spirit or essential characteristics thereof, the present embodiment is therefore illustrative and not restrictive.

FIG. 3 is an enlarged partial vertical sectional view of the center portion of the machine taken on line 3—3 in FIG. 2, including the center island and valve arrangement cooperatively controlling the filtration cycle.

FIG. 4 is a bottom view taken on line 4—4 of FIG. 3.

FIG. 5 is an enlarged vertical sectional view of a central portion taken from FIG. 3 mainly illustrating the construction of the center island.

FIG. 6 is a cross-sectional view taken on line 6—6 of FIG. 5.

FIG. 7 is a reduced separate detail view of a modified form of the center island per se.

FIG. 8 is an enlarged partial vertical sectional view of the machine taken on line 8—8 of FIG. 2, illustrating novel features in the construction of grid support means for the divider strips and the filter media.

FIG. 9 is an enlarged fragmentary view taken from FIG. 8 more clearly illustrating details of the grid support construction.

FIG. 10 is a fragmentary top view of the filter table taken on line 10—10 in FIG. 8, with the filter media and backing panel broken away to expose the underlying grid support structure rigidly connected to the filter pan.

FIG. 11 is an enlarged vertical sectional detail view taken on line 11—11 in FIG. 10, further illustrating the novel support arrangement for the divider strips.

FIG. 12 is a greatly enlarged detail plan view indicated by the dot-and-dash circle in FIG. 10.

FIG. 13 is a detail vertical sectional view taken on line 13—13 in FIG. 12.

FIG. 17 is a vertical sectional detail view taken on line 17—17 in FIG. 2, illustrating a construction wherein the filter table is diametrically split.

FIG. 18 is a further detailed sectional view taken on line 18—18 in FIG. 17.

Figure 1:
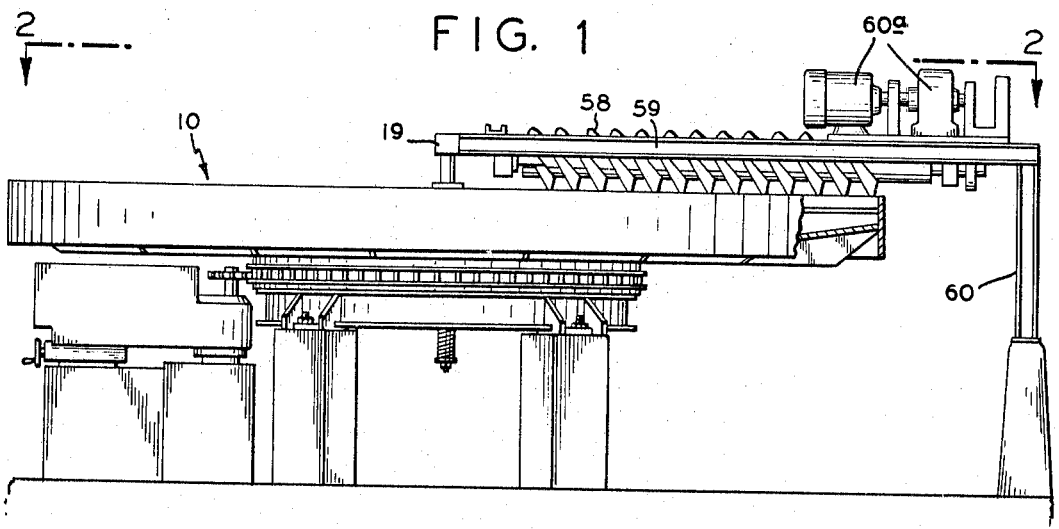
FIG. 1 is a side view of a rotary table filter embodying the invention.

In the type of table filter herein shown as an example to embody the invention, the rotary filter table or filter pan construction 10 comprises a center island 11 surrounded by the annular filter pan 12 welded to the center island.

The center island in this example comprises an annular bottom portion 13 provided with filtrate discharge openings 14 spaced around the vertical axis A—A, a top portion 15 of the same outer diameter as that of the bottom portion, and an intermediate cylindrical portion 16 rigidly interconnecting the top and bottom portions, and constituting therewith an annular recess 17. This recess in turn is subdivided by vertical ribs 17a alternating with the filtrate discharge openings, and having vertical outer edge faces E–1 in line with the outer cylindrical faces of the top and bottom portions. All these faces of the center island are preferably machined cylindrically and perpendicular to the machined bottom face 18 which includes the underside of a machined peripheral shoulder 14a formed on the bottom portion. For practical purposes, the top portion 15 comprises parallel horizontal annular parts 15a and 15b rigidly interconnected by cylindrical part 15c and internally stiffened by radial ribs 15d. A pivot bearing 19 is mounted on the top portion concentric with the vertical axis, for the support of a conventional filter cake discharge scroll.

The intermediate cylindrical portion has radial internal stiffening ribs 21.

The annular filter pan 12 comprises radial partitions 22 having their inner squared-off ends E–2 welded to the center island, in substantial registry with the ribs 17a thereon. The radial partitions being evenly spaced around the center island have a top edge 22a and are preferably formed with a horizontal bottom flange 22b, the inner ends of the radial partitions being aligned upon the shoulder 14a so that all the bottom flanges have a substantially common horizontal plane.

Fitted in between respective radial partitions are sector-shaped pan bottom sections 23 sloping downwardly towards the center island and to the respective filtrate discharge openings. These bottom sections have their side edges welded to the respective sides of the associated radial partitions, and their narrow ends welded to the center island adjacent to the respective filtrate discharge openings. A peripheral outer boundary wall 24 which may consist of arcuate component sections endwise but welded together, surrounds the pan bottom and is welded thereto and to the outer ends of the radial partitions, thus completing the sector-shaped filtration chambers F of the pan structure.

Each of the filtration chambers has rigidly built into it a horizontal grid structure 25, and the manner of its construction represents an important feature of this invention, since it provides a horizontal support plane, or a horizontal reference plane for the support of the filter media, parallel to the bottom face of the center island, greatly simplifying the manufacturing procedure to be described in more detail below.

Figure 16:
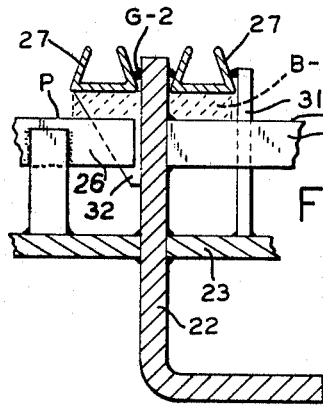
FIG. 16 shows other means for supporting the divider strips.

Accordingly, in the preferred embodiment, the grid structure comprises a plurality of transverse horizontal grid members 26 horizontally spaced and endwise welded as at w to the respective sides of the associated partial partitions. The transverse members are positioned with their top edges horizontally level with one another as well as parallel to the level bottom face of the center island, and then fixed in that position. Eventually all the top edges will extend in a substantially common horizontal plane parallel to the horizontally levelled bottom face of the center island, and substantially parallel to the common plane of the bottom flanges of the radial partitions. However, support for the transverse members may also be derived from the pan bottom, instead of from the sides of the radial partitions. For example, posts or the like may be welded to the pan bottom, and the transverse members may be fixed laterally to these posts at the properly adjusted level elevation, in which case the ends of the transverse members may terminate short of the partition walls, and need not be welded thereto (see FIG. 16).

According to FIGS. 10, 11, 12, the transverse grid members are positioned endwise against the respective sides of the converging associated radial partitions, and vertically gauged to have their top edges level in a common horizontal plane P located somewhat below the top edges of the partitions, as indicated by the vertical distance $d$. However, that distance while serving a special purpose is non-critical, nor are the distances of the transverse grid members from the vertical axis A—A, nor do the transverse members of a grid structure have to be exactly parallel to one another.

However, the common plane P (see FIGS. 8, 9, 11, 12) serves as a support plane for radial channel-shaped divider strips 27 having a flat bottom and upwardly converging sides. The divider strips are placed upon the transverse grid members laterally against the upwardly projecting top edge portion $d$ of the respective radial partitions (see FIG. 11). Consequently, the top edges of the divided strips in turn are located in a common horizontal plane parallel to plane P, a distance $e'$ above the top edge of the radial partitions. At their free side the divider strips are tack-welded as at 28 to the respective supporting transverse grid members, while the opposite side forms with the adjoining top edge portion $d$ a V-shaped groove G-1 in which and along which a sealing weld 29 may be applied. However, tack welds may be applied in this groove at points spaced along the divider strip and preferably at points opposite to the tack welds 28, with the intervening lengths of the grooves closed by suitable other sealing means such as epoxy or the like. However, the entire length of the groove may be epoxy-filled, if the support connections for the divider strips are otherwise sufficient.

Figure 15:
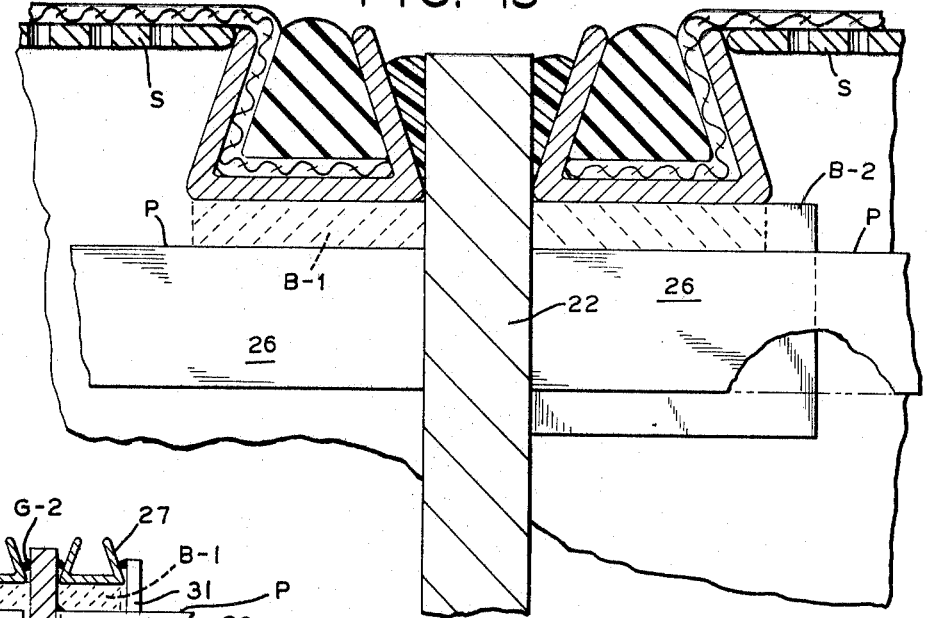
FIG. 15 is a vertical sectional view taken on line 15—15 in FIG. 14.

Intermediate the transverse grid members, the divider strips may be additionally supported by means of blocks 30 or the like tack-welded to the bottom of the divider strips as well as to the adjoining partition wall. It may be desirable (see FIGS. 15 and 16) to have the actual horizontal support plane for the divider strip raised somewhat above the plane P, for instance by means of removable measuring blocks B-1 indicated in dot-and-dash. The divider strips may be fixed in such relatively raised position as by welding to equally raised supporting blocks B-2 (see FIG. 15), or supporting posts 31 (see FIG. 16) having their foot ends welded to the pan bottom and their top ends welded laterally to the divider strips. In another example (see FIG. 16), the divider strips are prepared with transverse ribs 32 welded to the bottom face thereof, and with the divider strips properly levelled upon or relative to the reference plane, these ribs will then become supporting ribs if welded to the adjoining radial partitions.

Preferably, with only one divider strip associated laterally with each radial partition, the inner ends and the outer ends of the divider strips are interconnected by respective inner and outer arcuate channel members 33 and 34 having a cross-sectional profile substantially similar to that of the divider strips. These arcuate channel members are connected to the divider strips, so as to constitute therewith a channel system for mounting and edgewise securing the filter media for the respective sector-shaped filtration chambers. The arcuate channel members adjoining the center island and the outer peripheral boundary wall respectively, constitute therewith narrow grooves G-2 similar to those formed between the divider strips and the adjoining radial partitions, for containing a suitable sealing compound or a welding seam.

As illustrated in FIGS. 11, 12, 13, the arcuate channel members are connected with one another and with the divider strips so as to constitute the aforementioned channel system for fastening and sealing the filter media for each of the sector-shaped filtration chambers. According to a feature shown in FIG. 12, the arcuate channel members have junctures 36 located adjacent to respective divider strips, and so as to be backed up by a recess or cutout 37 (see FIG. 13) provided in the associated radial partition. The juncture itself may be a welding connection along the inner contour of the channel members, occupying a small gap $t$ between the square-off ends of the channel members, and backed up by the partition. The divider strips are bevelled into the respective arcuate channel members in the manner indicated at 38, and welded thereto.

Fixedly supported in plane P upon the transverse grid members 26 are radial grid members 39 which may be welded to the transverse members, and which may have their ends rigidly secured by and welded to blocks or posts 40 or the like. A sector-shaped perforated backing plate or backing panel S rests upon the top faces of these radial grid members, and is thus located in a plane parallel to the previously established reference plane P. These radial grid members or spacer elements are of a height such that the top surface of the backing plates supported thereon will be substantially co-planar with the top edges of the divider strips. Consequently, after the filter media have been applied and marginally secured in the channel system as shown, they will be coplanar with one another and horizontally parallel to the reference plane. The radial grid members 39 instead of being fixed to the underlying transverse members, may be fixed or welded to the perforated backing plate above. Supplemental or intermediate support for the transverse grid members 26 (see FIGS. 8 and 9) is provided by posts 41 having their foot ends welded to the pan bottom, and their top ends welded laterally to respective transverse grid members.

The radial partitions are properly positioned and aligned for effecting the welding connections with the center island. The horizontal bottom flange 22b of the radial partitions, through suitable jig arrangements, may serve to facilitate not only horizontal alignment in a common plane, but also radial alignment with respective vertical ribs of the center island, prior to effecting the weld connection between the center island and the radial partitions along the vertical line of their mutual abutment. However the bottom flanges 22b also serve to facilitate the proper mounting of an annular support bearing 43 for the filter table, making such mounting relatively simple and inexpensive to execute. Accordingly, the rotary top ring member or race way 44 of the bearing is bolted to the underside of flanges 22b as shown in FIGS. 3 and 8 in such a manner that the working plane of the bearing will be horizontally parallel to the horizontal reference plane P of the grid structures as well as parallel to the bottom face 18 of the center island.

In the embodiment illustrated in FIG. 11, the radial partition 22 comprises a foot portion 22c of angular profile, and a straight vertical top portion 22d welded buttwise to the vertical shank of the foot portion. This is indicated by the welding seam 22e (see also FIG. 8) extending on a slope close to, and substantially parallel to the underside of the pan bottom. Such a composite construction of the radial partition provides substantial economical advantages in the case of filter applications where, as for example in the filtration of phosphoric acid slurry, the pan structure must be of costly stainless steel. According to this feature, only the top portion 22d need be of stainless steel, allowing the substantial foot portion to be made of ordinary steel at a fractional cost relative to stainless steel.

The exact levelling of this upper bearing ring relative to the horizontally levelled reference plane, may be effected, if necessary, by the use of shims between said bottom flanges 22b and the upper bearing ring, or by other suitable adjustment means. The upper bearing ring, through anti-friction bodies or balls 45 operates on a stationary base ring or lower bearing race 46 which in turn is horizontally levelled and bolted to a double-flanged sturdy annular supporting base 47 anchored to a suitable number of supporting piers 48.

The bottom face of the center island has removably fastened thereto a replaceable annular wear plate 49 which has prepared parallel top and bottom faces, and throughflow openings registering with the filtrate discharge openings 14. The annular bottom wear plate of the center island has cooperating therewith a conventional annular stationary valve body 50 for automatically controlling the filtration cycle in a manner well known of itself.

This valve body is supported from a hub portion 50a having spider arms 51 connecting it rigidly and concentrically to the center island. Fixed in this hub portion is a depending stem 52 rotating with the filter table. The stationary valve body has a correspondingly arranged concentric hub portion 53 wherein the depending stem may rotate. A compression coil spring 54 surrounding the downwardly protruding end portion of the stem is confined between the hub portion 53 and an annular thrust bearing 54a secured in position by lock nuts 55 on the lower end of the stem. With the spring tension thus adjustable, the valve body may be held in suitable rubbing contact with the wear plate on the rotating filter table, while the valve body itself is secured against rotation as by means of a pair of parallel horizontal tie rods 56 and 57 mounted and anchored upon the annular supporting base 47 substantially in the manner shown in FIG. 4.

Figure 2:
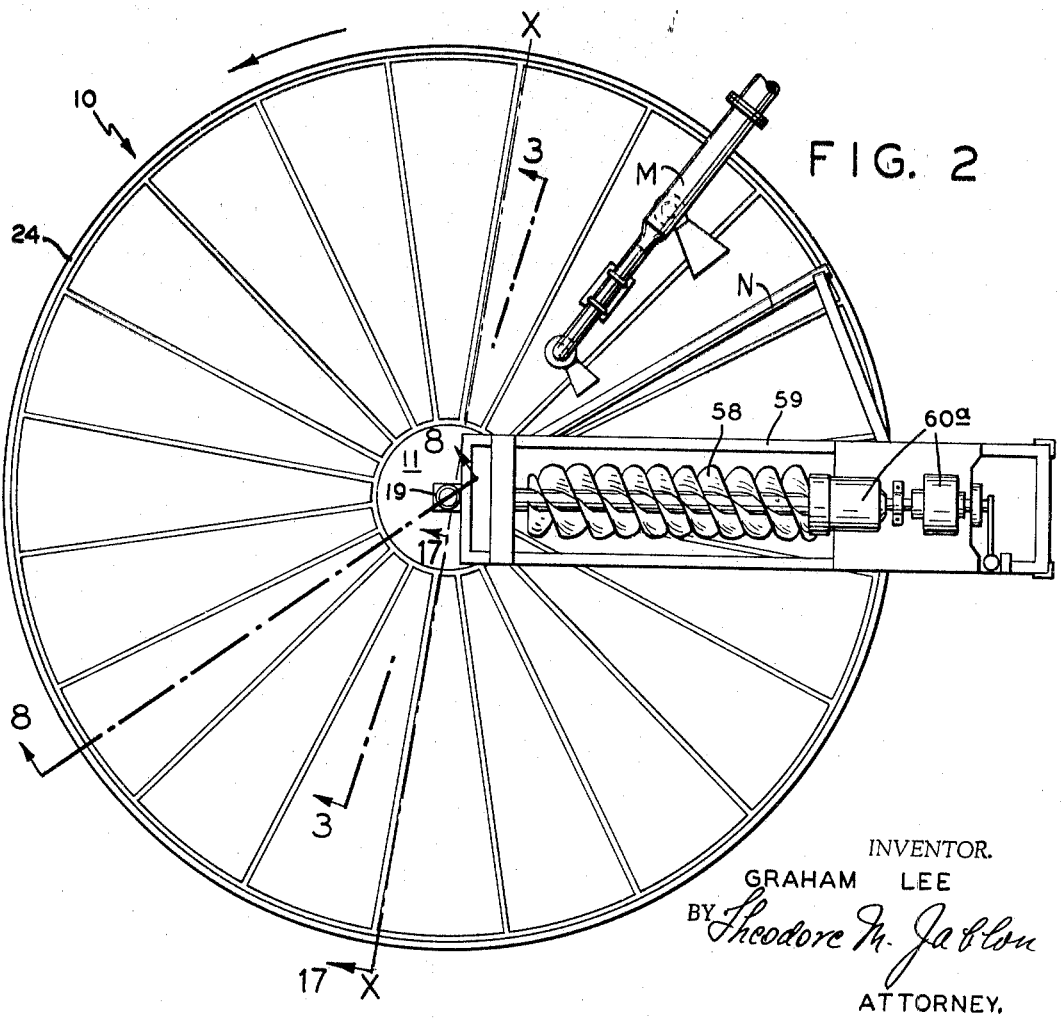
FIG. 2 is a plan view of the machine, taken on line 2—2 in FIG. 1, showing sector-shaped filter media bounded by radial divider strips and by transverse or arcuate channel members at the respective inner and outer ends of the channel shaped divider strips.
Figure 14:
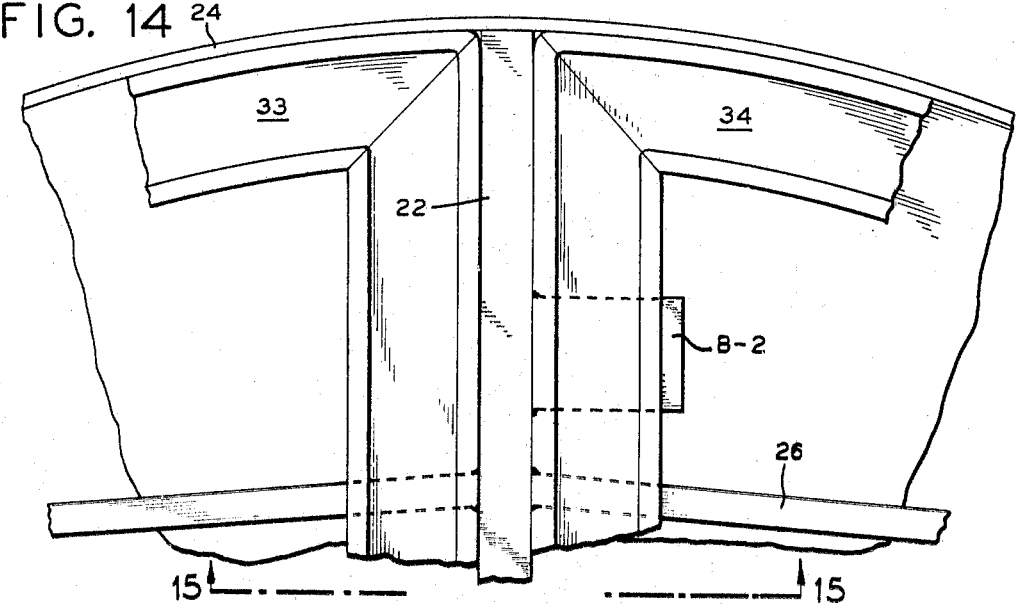
FIG. 14 is a detail plan view similar to FIG. 12 of a modified arrangement thereof.

FIGS. 1 and 2 show the arrangement of a conveyor scroll device for discharging the filter cake from the filter table. In a conventional arrangement the radially extending conveyor scroll 58 is mounted for rotation in a horizontal frame 59 the inner end of which is supported on the pivot bearing 19 atop the center island, with a vertical structure 60 supporting the outer end. Also mounted upon frame 59 is motorized drive unit 60a for the conveyor scroll.

A feature of practical importance, especially for large filters, lies in the construction of a filter table that is diametrically split, so that it may be shipped in two half-round parts, and properly re-assembled at its destination. After the two halves have been fitted and bolted together, a welding seam may be applied making the connection permanent and leak proof.

In a preferred embodiment, the diametrical split indicated by the dot-and-dash line X—X in FIG. 2, is through the center island, as well as through the surrounding filter pan along a pair of radial partitions extending from the center island in opposite directions. Flange connections are provided along the line of split. Referring to FIGS. 17 and 18, the flange connections for the pan comprise a vertical section $a$ internally at the peripheral boundary wall, and a sloping section $b$ extending radially along the underside of the pan bottom and including the radial partitions themselves and a companion flange 61 therefor. In the center island the flange connections comprise extending internally thereof, a lower vertical section $c$, a horizontal intermediate section $d$, and an upper vertical section $e$.

In summary, the invention in a preferred form provides a filter table construction which can be built from the bottom up, in a procedure which mainly requires only to set up the prepared center island initially, then stepwise positioning and welding the pan structure around it so it is welded to the center island, and then setting up the grid structures in each of the sector-shaped filtration compartments, first levelling them and then fixing or welding them in place, so as to provide the horizontal support or reference plane for the divider strips and eventually for the filter media, and attaching the upper bearing ring or runner of the annular support bearing horizontally level to the underside of the pan, that is to the bottom flanges of the radial partitions and concentric with the center island, all the while maintaining the upright position of the pan.

The construction according to the invention is therefore time and money saving, in that it eliminates machining of large diameters on both sides, and the necessity of turning this large workpiece from one side to the other, such operations requiring excessive labor and equipment such as a huge boring mill and enough head room below the hoist for turning over a workpiece of such large diameter in the shop.

A construction procedure, in view of the foregoing invention, is as follows:

(a) Setting up the prepared center island on a working fixture;

(b) Setting up the radial partitions 22 on the fixture with the inner ends of the bottom flanges resting on prepared shoulder 14a of the center island, and aligned in a common horizontal plane, and the vertical leg or portion of the partition aligned with the complementary radial ribs 17a of the center island;

(c) Welding the radial partitions to the center island by welding the mutually adjoining vertical edges (E–1 and E–2) thereof to one another;

(d) Assembling and positioning the arcuate component sections of the outer boundary wall 24 against the outer ends of the radial partitions as well as endwise adjoining one another;

(e) Welding the sections of the boundary wall to one another as well as to the outer ends of the radial partitions;

(f) Positioning the prepared pan bottom sectors 23 in place between respective pairs of radial partitions and with the outer convexly curved edges adjoining the curvature of the boundary wall, and the inner ends resting on the annular bottom portion of the center island;

(g) Welding the edges of the bottom sectors in place to complete the basic pan structure divided into sector-shaped filtration chambers;

(h) Freeing and lifting the pan structure from the fixture, so the underside becomes accessible, and supporting the structure so the bottom face is level;

(i) Attaching the upper bearing ring to the underside of the bottom flanges of the radial partitions, so it is level and parallel to the level bottom face of the center island and concentric therewith;

(j) Lowering the pan structure onto a prepared level base construction including the lower bearing ring with the antifriction balls in place, so the pan structure is now rotatable in a level horizontal bearing plane;

(k) Positioning the transverse grid members 26 in the respective filtration chambers with their top edges level and in a common plane located at a predetermined elevation such that the projecting top end portion $d$ of the radial partitions is lower than the height of the channel members;

(l) Welding the transverse grid members in place;

(m) Positioning the radial channel members 27 on the transverse grid members and laterally adjoining the radial partitions, and welding the channel members in place;

(n) Adding the remaining parts such as the arcuate channel members, 33 and 34 the radial grid members or spacer members 39, and the perforated backing plates S, substantially as shown.

It will be understood that each of the elements, or two or more together, of the apparatus herein described, may also find useful application in table filters differing from the type described above.

Furthermore, while the invention has been illustrated and described as embodied in a table filter featuring radial partitions having horizontal top edge portions connected laterally to the divider strips, and having horizontal bottom edge portions on flanges below the pan bottom utilized for attaining a level mounting of the runner of the annular support bearing, the construction is not intended to be limited to the details shown, since various modifications and structural changes may be made without departing from the spirit of the present invention.

I claim:

1. The method of constructing the horizontal filter pan for a horizontal rotary table filter, which comprises:
    (a) setting up a prepared center island on a working fixture, said center island having a bottom shoulder and outwardly directed radial ribs;
    (b) setting up on the fixture radial partitions having bottom flanges, with inner ends of the bottom flanges resting on said prepared shoulder of the center island, and the flanges aligned in a common horizontal plane, and the vertical portion of the partitions aligned with the said radial ribs of the center island;
(c) welding the radial partitions to the center island by welding the mutually adjoining vertical edges thereof to one another;
(d) assembling and positioning an outer boundary wall against the outer ends of the radial partitions;
(e) welding the boundary wall to the outer ends of the radial partitions;
(f) positioning prepared pan bottom sectors in place between respective pairs of radial partitions and with their outer convexly curved edges adjoining the curvature of the boundary wall, and the inner ends resting on the annular bottom portion of the center island;
(g) welding the edges of the bottom sectors to the adjoining parts, to complete the basic pan structure divided into sector-shaped filtration chambers;
(h) freeing and lifting the pan structure from the fixture, so the underside becomes accessible, and supporting the structure so the bottom face is level;
(i) attaching an upper bearing ring to the underside of the bottom flanges of the radial partitions, so it is level and parallel to the level bottom face of the center island and concentric therewith;
(k) lowering the pan structure onto a prepared level base construction;
(l) positioning transverse grid members in the respective filtration chambers with their top edges level and in a common plane located parallel to the bottom face of the center island and at a predetermined elevation;
(m) welding the transverse grid members in place;
(n) placing and fixing radial grid members in position upon the transverse grid members;
(o) positioning radial channel members on the transverse grid members and laterally adjoining the radial partitions, and welding the channel members in place, said radial channel members being so located that the projecting top end portion of the radial partitions is lower than the projecting top end portion of the channel members;
(p) placing and fixing inner and outer arcuate channel members in position to interconnect the inner and outer ends of respective radial channel members, in a plane with said radial channel members;
(q) placing sector-shaped backing panels upon said radial grid members, and
(r) applying filter media upon the respective panels, and edgewise fastening and sealing them in the respective radial and arcuate channel members surrounding respective panels.

2. In a rotary table filter, a filter pan construction which comprises,
a center island having an annular bottom portion, said annular bottom portion having filtrate discharge openings spaced around the vertical axis of the center island, and having a bottom face at right angles to the axis of rotation;
an annular pan bottom with radial partitions and with an outer peripheral boundary wall provided thereon concentric with said center island, said pan bottom and radial partitions being connected to said center island so as to constitute therewith sector-shaped filtration chambers associated with respective filtrate openings,
transverse horizontal support members horizontally spaced from one another in fixed position in each of said filtration chambers, and having top edges uniformly levelled in a horizontal reference plane which is parallel to said bottom face of the center island,
radial horizontal support members of a predetermined height, extending across and in fixed relationship with said transverse members so that their top edges in turn define a plane parallel to said reference plane,
radial channel-shaped divider strips extending laterally along and adjacent to respective radial partitions, said divider strips located at an elevation at which the radial partitions do not protrude above the top edges of the divider strips, and being in fixed and parallel relationship to said reference plane,
inner arcuate channel members conforming to the outer periphery of the top portion of the center island and interconnecting the inner ends of respective channel-shaped radial divider strips in a common plane therewith,
outer arcuate channel members conforming to the inner contour of said peripheral boundary wall, and interconnecting the outer ends of respective radial channel-shaped divider strips in a common plane therewith, the connections between the radial divider strips and the arcuate inner and outer channel members being such as to provide along the outline of each sector-shaped filtration chamber a sealing groove, with all the sealing grooves extending in a common plane,
liquid-permeable sector-shaped filter panel means supported on said radial members and thus parallel to said reference plane, said panel means being surrounded by said sealing grooves and being so located that the top face of said panel means is substantially coplanar with the top edges of said divider strips,
filter media supported on said panel means, and fastening means sealingly securing said filter media in said sealing grooves.

3. The filter pan construction according to claim 2, wherein said radial members are fixed to the top edges of said transverse members.

4. The filter pan construction according to claim 2, wherein said transverse members have their ends fixed to respective radial partitions.

5. The filter pan construction according to claim 2, wherein said transverse members rigidly interconnect the sides of a respective sector-shaped filtration chamber, and said radial members are fixed to the top edges of said transverse members.

6. The filter pan construction according to claim 2, wherein lugs are fixed to respective sides of the radial partitions providing support for said channel-shaped divider strips.

7. The filter pan construction according to claim 2, wherein said transverse members have their ends fixed to respective radial partitions, and including vertical support members having their upper ends fixed laterally to respective transverse members, and their foot ends fixed to the pan bottom.

8. The rotary table filter according to claim 2, wherein vertical support members are provided having their foot end portions fixed to the pan bottom and their top end portions fixed laterally to respective transverse members.

9. The rotary filter according to claim 2, wherein each of the radial partitions has one channel-shaped divider strip laterally associated therewith, the ends of each divider strip being connected with respective inner and outer arcuate channel members of the adjoining filtrate chambers, so as to constitute therewith a continuous groove system, said inner and outer channel members respectively having mutually adjoining ends located upon the top edge of respective radial partitions, the outer ends of the top edge portion of said radial partitions being shaped to accommodate the outer contour of said mutually adjoining ends of the arcuate channel members, and wherein a sealing juncture is provided between said adjoining ends backed by said top edges of the partitions.

10. The rotary table filter according to claim 2, wherein each of the radial partitions has a channel-shaped divider strip rigidly associated therewith at each side thereof, so that each of the filtration chambers is flanked by a separate pair of divider strips having their inner ends connected to a respective inner arcuate channel member and their outer ends connected to a respective outer arcuate channel member, so as to constitute endless grooves conforming to the respective filtration chambers.

11. The filter pan construction according to claim 2, wherein the center island has a hollow top portion rising concentrically from the inner periphery of said annular bottom portion, wherein said radial partitions have squared-off vertical inner edges, wherein said hollow top portion of the center island comprises an upper cylindrical portion of a diameter substantially the same as that of the bottom portion, and intermediate cylindrical portions of substantially smaller diameter interconnecting the cylindrical top portion with the inner periphery of said annular bottom portion so as to constitute therewith and with said cylindrical top portions an annular recess, said center island being provided with vertical radially outwardly extending ribs edgewise welded to the contour of said annular recess so that the outer vertical edges of the ribs coincide with the outer cylindrical face of said bottom portion and said top portion of the center island perpendicular to the bottom face thereof, said inner vertical terminal edges of the radial partitions being welded to said vertical edges of the ribs.

12. The filter pan construction according to claim 2, wherein the transverse support members have their ends adjacent to respective radial partitions, and wherein said channel-shaped divider strips are supported upon the adjacent ends of respective transverse support members.

References Cited

UNITED STATES PATENTS

| 1,150,263 | 8/1915 | Godbe | 210—396 X |
| 2,588,912 | 3/1952 | Denhard | 210—396 |
| 2,798,612 | 7/1957 | Crumb | 210—393 |
| 2,818,177 | 12/1957 | Richards | 210—390 |
| 3,080,063 | 3/1963 | Krynski et al. | 210—330 |
| 3,150,082 | 9/1964 | Rich | 210—395 |
| 3,361,262 | 1/1968 | Orr et al. | 210—330 |

REUBEN FRIEDMAN, Primary Examiner

W. S. BRADBURY, Assistant Examiner

U.S. Cl. X.R.

210—345, 395